(12) United States Patent
Speer et al.

(10) Patent No.: US 7,575,218 B2
(45) Date of Patent: Aug. 18, 2009

(54) MAGNET VALVE

(75) Inventors: Harald Speer, Freiberg (DE); Thomas Michl, Stuttgart (DE); Ralf Schindler, Leonberg (DE); Dietmar Kratzer, Tamm (DE); Elmar Vier, Freiberg A. N. (DE); Gerhard Schuster, Freiberg (DE)

(73) Assignee: Robert Bosch GmbH, Stuttgart (DE)

( * ) Notice: Subject to any disclaimer, the term of this patent is extended or adjusted under 35 U.S.C. 154(b) by 76 days.

(21) Appl. No.: 11/700,010

(22) Filed: Jan. 31, 2007

(65) Prior Publication Data
US 2007/0176136 A1 Aug. 2, 2007

(30) Foreign Application Priority Data
Feb. 1, 2006 (DE) .................. 10 2006 004 530

(51) Int. Cl.
*F16K 31/02* (2006.01)
(52) U.S. Cl. .................. 251/129.02; 335/296
(58) Field of Classification Search ............ 251/129.02, 251/129.15; 335/296
See application file for complete search history.

(56) References Cited

U.S. PATENT DOCUMENTS

| 6,084,493 | A | * | 7/2000 | Siegel ........................ 335/278 |
| 6,268,784 | B1 | * | 7/2001 | Feigel et al. ................ 335/261 |
| 6,305,583 | B1 | * | 10/2001 | Ward et al. .................. 222/504 |
| 6,719,267 | B2 | * | 4/2004 | Torii et al. ............. 251/129.15 |
| 6,994,234 | B2 | * | 2/2006 | de Leeuw ................... 222/504 |
| 7,341,320 | B2 | * | 3/2008 | Otsuka et al. ............ 303/119.2 |

* cited by examiner

*Primary Examiner*—John K Fristoe, Jr.
(74) *Attorney, Agent, or Firm*—Ronald E. Greigg

(57) ABSTRACT

The invention relates to a magnet valve, having a valve insert and a tappet guided movably in the valve insert via a tappet guide, which tappet is braced on a valve body via a restoring spring resting a contact face of the tappet, and the restoring spring is guided radially from inside on one end by a spring guide of the tappet, the spring guide adjoining the contact face. According to the invention, centering means are present, which are disposed on the tappet in such a way that the restoring spring is centered and radially guided from inside over a substantial portion of its length.

19 Claims, 3 Drawing Sheets

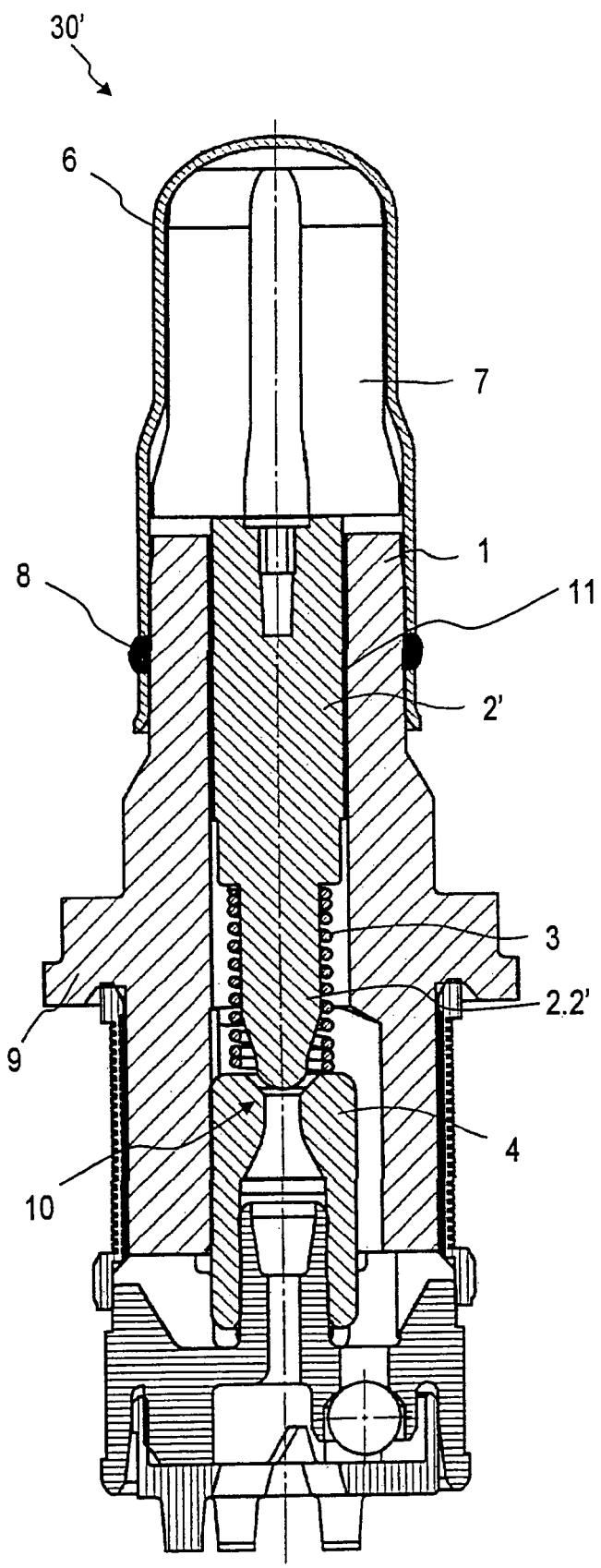
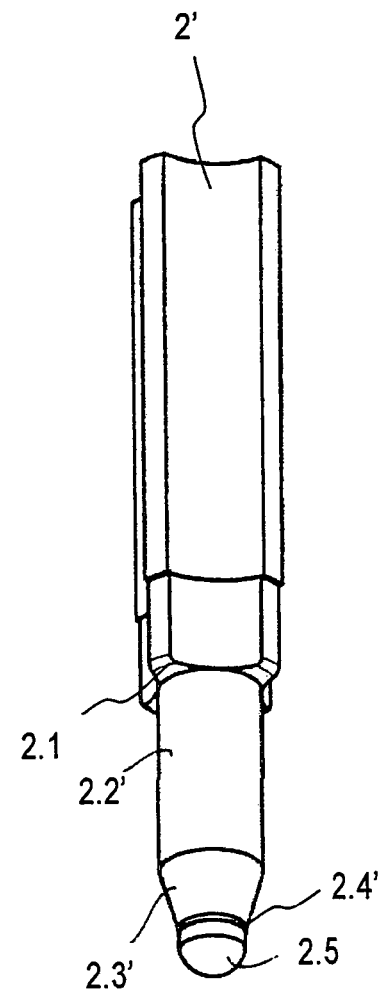
Fig. 5
Fig. 6

MAGNET VALVE

REFERENCE TO FOREIGN PATENT APPLICATION

This application is based on German Patent Application No. 10 2006 004 530.0 filed 1 Feb. 2006, upon which priority is claimed.

BACKGROUND OF THE INVENTION

1. Field of the Invention

The invention is directed to an improved magnet valve suitable for use, for example, in hydraulic fluid systems.

2. Description of the Prior Art

A conventional magnet valve, in particular for a hydraulic unit, which is used for instance in an antilock system (ABS) or a traction control system (TCS) or an electronic stability program (ESP) system is shown in FIG. 7. As seen from FIG. 7, the conventional magnet valve 40, which is open when without current, has, besides a magnet assembly 5 with a cover disk 12, a valve cartridge, which includes a capsule 6, a valve insert 1, a tappet 20, a restoring spring 3, and an armature 7. In the production of the magnet valve 40, the capsule 6 and the valve insert 1 of the valve cartridge are joined together by pressing, and by means of a sealing weld 8, the valve cartridge is hydraulically sealed off from the atmosphere. In addition, the valve insert 1 absorbs the pressure forces that occur in the hydraulic system and conducts them onward via a calked flange 9 to a calked region, not shown, on a fluid block. The valve insert 1 also receives the so-called valve body 4, which includes a valve seat 10 into which the tappet 20 plunges in sealing fashion in order to accomplish the sealing function of the magnet valve 40. As also seen from FIG. 7, the tappet 20 and the restoring spring 3 are guided in the valve insert 1, and the tappet 20 is guided in a tappet guide 11 and the restoring spring 3 is radially guided and centered at one end on the tappet 20 and rests on a contact face 21, and at the other end rests, axially guided, on the valve body 4.

FIG. 8 shows a conventional exemplary embodiment of the tappet 20. As seen from FIG. 8, the conventional tappet 20 includes the axial contact face 21, a spring guide 22 onto which the restoring spring 3 is slipped and guided radially on the inside in the short region of the spring guide 22, and a tappet cone 23 with a transition region 24 between the spring guide 22 and a tappet dome 25, which plunges in sealing fashion into the valve seat 10. No further fixation or centering of the restoring spring 3 at its installation site is provided for. The flow path of the fluid through the magnet valve extends via the restoring spring 3, so that the spring force of the restoring spring 3 is operative in the region of the flow forces, which because of the flow are capable of acting on the turns of the restoring spring 3. If the order of magnitude of the spring force and the order of magnitude of the stiffness of the restoring spring 3 are within the range of the forces of the flow acting on the spring turns, unwanted influence on the spring behavior by the flow can occur. For instance, lifting of the restoring spring 3 from its contact with the valve body 4 can occur, which can be associated with a corresponding (force) action on the valve tappet 20 and unwanted influence on the valve function. The unguided portion of the restoring spring 3 can furthermore be laterally deflected or shifted, so that contacts and hence frictional forces can occur between the valve insert 1 and the tappet 20. Because of the frictional forces generated, the valve behavior can be adversely affected, and the tappet 20 may be damaged by the spring ends, which may have burrs.

OBJECT AND SUMMARY OF THE INVENTION

The magnet valve of the invention has the advantage over the prior art that centering means are present, which are disposed on the tappet in such a way that the restoring spring is centered and radially guided from inside over a substantial portion of its length and is thus stabilized. Flow forces that act on the turns of the restoring spring can thus advantageously be prevented from causing lateral deflection of the restoring spring, or the restoring spring can be prevented from lifting from a contact, and the turns of the restoring spring can be prevented from moving relative to one another or being set to vibrating. In particular, a spring end resting only axially on a valve body is centered and stabilized by the centering means, without adversely affecting the capability of installing and adjusting the magnet valve.

By the provisions and refinements disclosed, advantageous improvements to the magnet valve recited in the independent claim are possible. It is especially advantageous that the centering means are embodied as at least two axially extending centering ribs, originating at the spring guide of the tappet, which lengthen the circumference of the spring guide beyond a tappet cone to inside a transition region of the tappet. Because of the at least two axial centering ribs, the restoring spring can advantageously be guided radially from inside over a longer distance, so that the restoring spring is centered and stabilized over virtually its entire length. Moreover, the flow behavior through the valve assembly is hardly affected by the embodiment of the centering means as axial centering ribs. The dimensions of the at least two axial centering ribs are adapted in the radial direction to the inside diameter of the restoring spring, so that the spring end resting only axially on the valve body is guided radially on the inside as far as possible. The at least two axial centering ribs are advantageously defined in such a way that a flow force component acting circumferentially through the fluid does not cause a rotational motion of the tappet. The length and shape of the axial centering ribs in the direction of a tappet dome are adapted to the usage conditions and prevent an adverse effect on the flow behavior through the valve assembly, and prevent spring parts or turns from catching on the centering ribs; as a result, a constant spring force action on the tappet and a controllable valve behavior can be assured.

In a feature of the magnet valve of the invention, the at least two axially extending centering ribs come to an end for instance virtually perpendicularly on one end, which is oriented toward a tappet dome. In addition, the virtually perpendicular ends of the at least two axially extending centering ribs can be embodied in rounded form, and a radius of the rounded portion is dependent on properties of the restoring spring. Alternatively, the at least two axially extending centering ribs can come to an end on one end shallowly at a predeterminable angle, the end is oriented toward a tappet dome. In addition, the ends, coming to an end shallowly at a predeterminable angle, of the at least two axially extending centering ribs can have a rounded transition, whose radius is dependent on properties of the restoring spring.

In a further feature of the magnet valve of the invention, the tappet includes four axially extending centering ribs, which preferably have an average spacing of 90° from one another.

Alternatively, the centering means can be embodied as a lengthened spring guide, which shortens the tappet cone and the transition region of the tappet, and the tappet cone is shifted in the direction of a tappet dome, and the restoring spring is centered and radially guided from inside over the substantial portion of its length.

BRIEF DESCRIPTION OF THE DRAWINGS

The invention will be better understood and further objects and advantages thereof will become more apparent from the ensuing detailed description of preferred embodiments taken in conjunction with the drawings, in which:

FIG. 5 is a schematic sectional view of a further exemplary embodiment of a magnet valve of the invention;

FIG. 6 is a schematic perspective view of a tappet for the magnet valve of the invention of FIG. 5;

DESCRIPTION OF THE PREFERRED EMBODIMENTS

Figure 1:
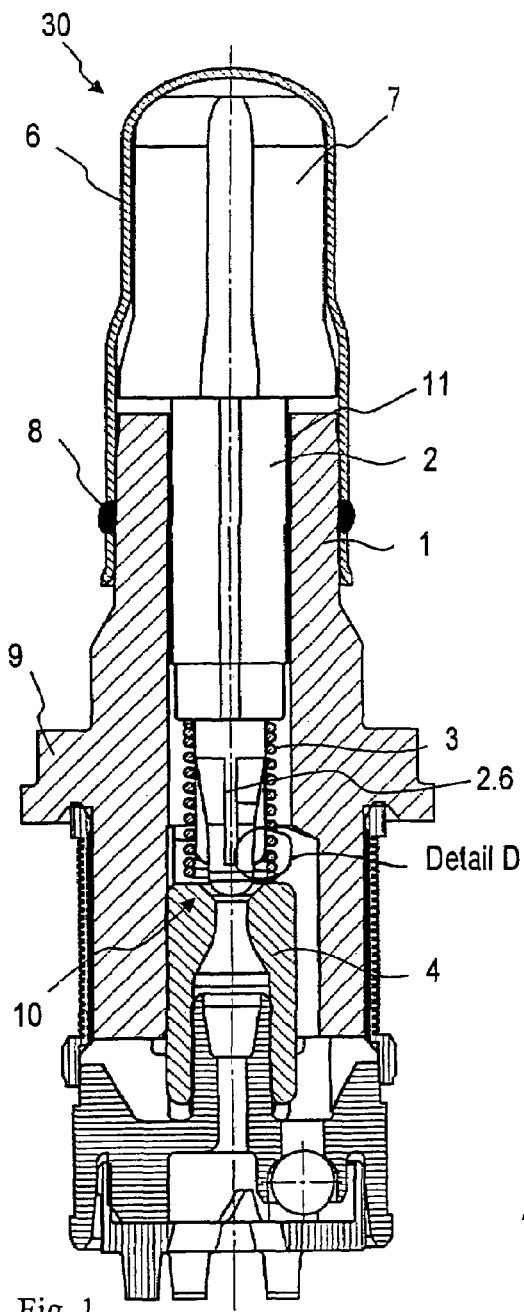
FIG. 1 is a schematic sectional view of one exemplary embodiment of a magnet valve of the invention.
Figures 7, 8:
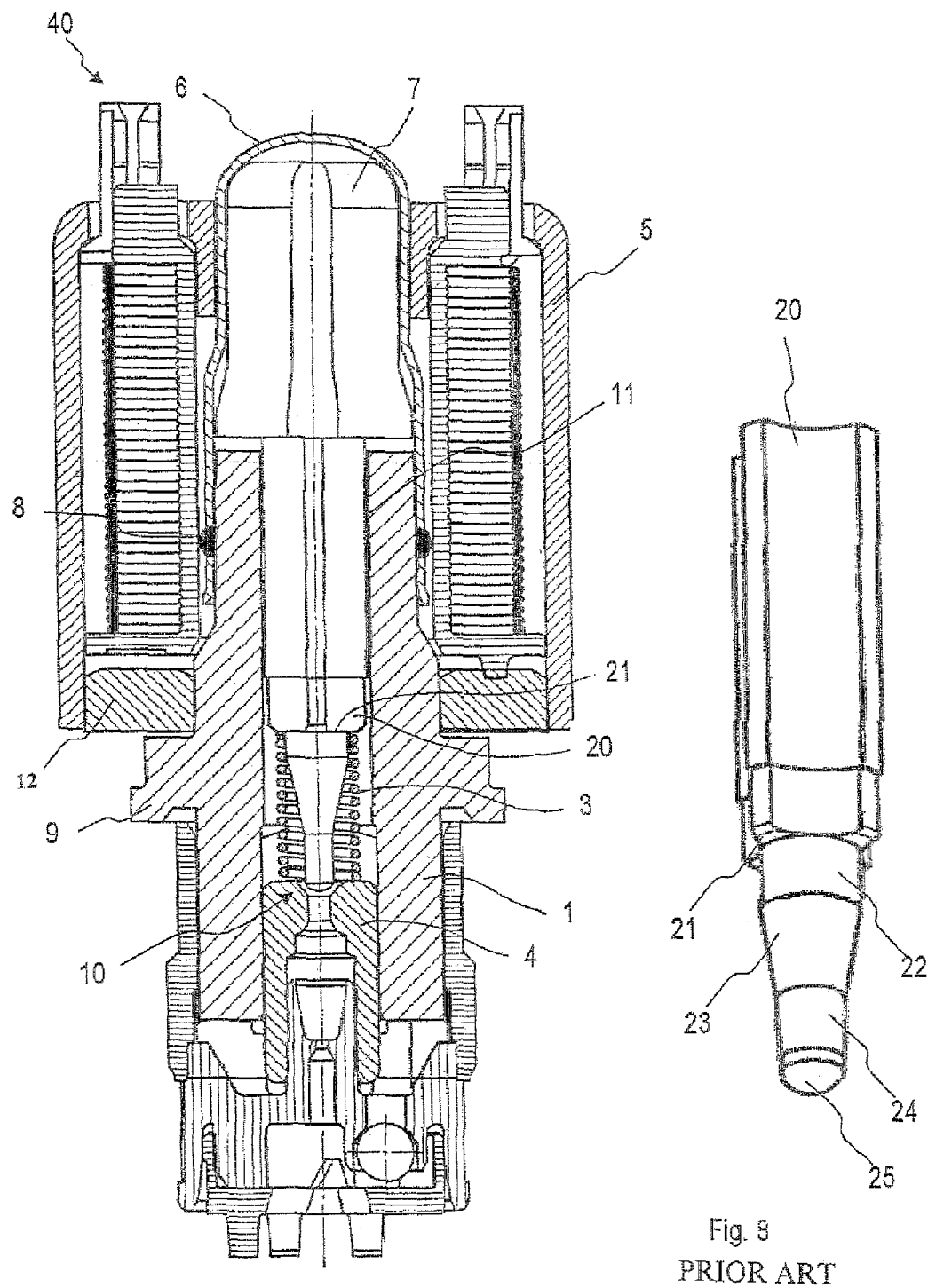
FIG. 7 is a schematic sectional view of a conventional magnet valve.
FIG. 8 is a schematic perspective view of a tappet for the conventional magnet valve of FIG. 7.

As can be seen from FIG. 1, a magnet valve 30 of the invention, besides a magnet assembly, not shown, has a valve cartridge, which analogously to the conventional magnet valve 40 of FIG. 7 includes a capsule 6, a valve insert 1, a tappet 2, a restoring spring 3, and an armature 7. In the production of the magnet valve 30, the capsule 6 and the valve insert 1 of the valve cartridge are joined together by pressing, and by means of a sealing weld 8, the valve cartridge is hydraulically sealed off from the atmosphere. In addition, the valve insert 1 absorbs the pressure forces that occur in the hydraulic system and conducts them onward via a calked flange 9 to a calked region, not shown, on a fluid block. The valve insert 1 also receives the so-called valve body 4, which includes a valve seat 10 into which the tappet 2 plunges in sealing fashion in order to accomplish the sealing function of the magnet valve 30. As also seen from FIG. 1, the tappet 2 is guided via a tappet guide 11, and the restoring spring 3 is guided via centering means 2.6 on the tappet 2 in the valve insert 1; in contrast to the conventional magnet valve 40 of FIG. 7, the restoring spring 3 is centered not just on one end via a relatively short length of a spring guide 22 on the tappet 2, but instead is radially guided and stabilized by the centering means 2.6 over virtually the entire spring length, so that the other end of the restoring spring 3, which rests on the valve body 4, is also centered and stabilized.

Figure 2:
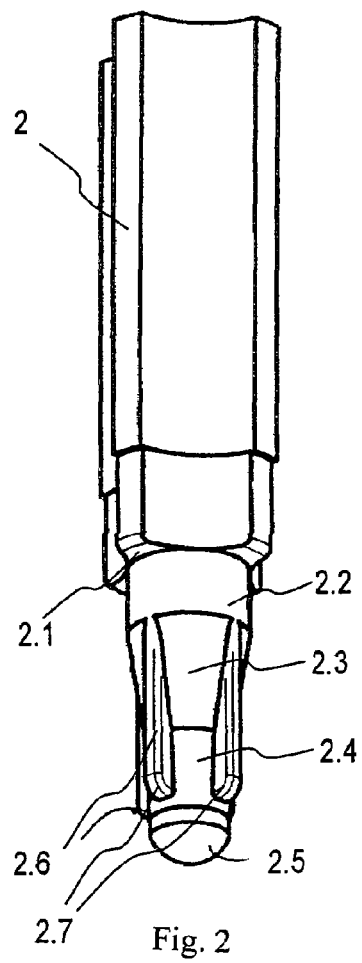
FIG. 2 is a schematic perspective view of a tappet for the magnet valve of the invention of FIG. 1.

As can be seen from FIG. 2, the tappet 2 for the magnet valve 30 of the invention as shown in FIG. 1 has a contact face 2.1; a spring guide 2.2, by which the restoring spring 3 slipped onto it is guided radially on the inside over a short region; a tappet cone 2.3; a transition region 2.4; a tappet dome 2.5, which plunges in sealing fashion into the valve seat 10; and centering means 2.6. In the exemplary embodiment shown, the centering means are embodied as four axially extending centering ribs 2.6, which originate at the spring guide 2.2 of the tappet 2 and have an average spacing of 90° from one another. The dimensions of the axial centering ribs 2.6 are adapted in the radial direction to the inside diameter of the restoring spring 3, so that the circumference of the spring guide 2.2 is extended beyond the tappet cone 2.3 into the transition region 2.4 of the tappet 2. As a result, the restoring spring 3 is centered and radially guided from inside over a substantial portion of its length. The centering means 2.6 advantageously prevent a fluid flow in the magnet valve 30 from having an unwanted influence on the spring behavior. Thus the centering means 2.6 for instance prevent lateral deflection of the restoring spring 3 and/or lifting of the restoring spring 3 from the valve body 4 and/or relative motions or vibration of the turns of the restoring spring 3.

The axial centering ribs 2.6 on the tappet 2 are designed such that a circumferentially acting flow force component through the fluid does not cause a rotary motion of the tappet 2, so that the wear-reducing effect of the invention can be attained. The length of the centering means 2.6 for the restoring spring 3 in the direction of the tappet dome 2.5 is adapted to the other usage conditions. For instance, the centering ribs 2.6 are not extended as far as the tappet dome 2.5, so as not to impair the flow behavior through the valve assembly. Moreover, the end of the axially extending centering ribs 2.6 in the direction of the tappet dome 2.5 is embodied in such a way, and the spring properties are adapted in such a way, that catching of spring parts or spring turns on the end 2.7 of the centering ribs 2.6 can be avoided.

Figure 3:
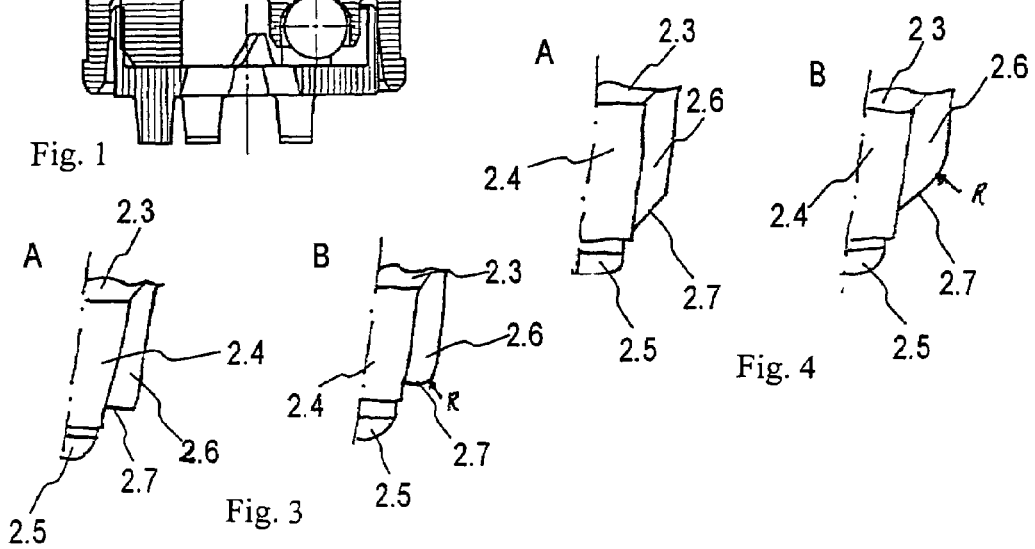
FIGS. 3 and 4 show schematic sectional views of a detail D of FIG. 1.
Figure 4:
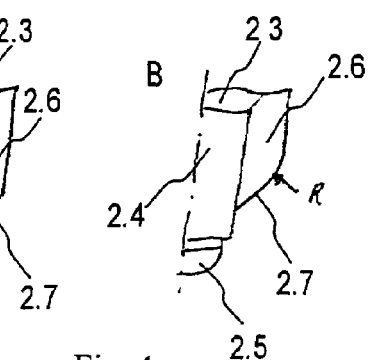

FIGS. 3 and 4 show various exemplary embodiments of the axially extending centering ribs 2.6. FIG. 3 shows embodiments of the centering ribs 2.6, which come to an end virtually at a right angle at the end 2.7. The end 2.7 of the centering ribs 2.6 as shown in view A has a straight edge, and the end 2.7 in view B is rounded, and a radius R of the rounded portion is dependent on the properties of the restoring spring 3, such as the embodiment of the turns and such as the dimensions, spacing, shape, and so forth.

FIG. 4 shows embodiments of the centering ribs 2.6, which come to an end at the end 2.7 shallowly at a predeterminable angle. The end 2.7 of the centering ribs 2.6 shown in view A has an edge as a transition to the end of the respective centering rib 2.6, and the end 2.7 as shown in view B has a rounded edge as a transition, and a radius R of the rounded portion is dependent on the properties of the restoring spring 3. The embodiments of FIG. 4 make it possible to achieve a smooth transition.

FIGS. 5 and 6 show a further exemplary embodiment of a magnet valve 30' of the invention. As seen from FIG. 5, the magnet valve 30' of the invention, analogously to the magnet valve 30 of FIG. 1, includes a capsule 6, a valve insert 1, a tappet 2', a restoring spring 3, and an armature 7; the capsule 6 and the valve insert 1 are joined together by pressing and are sealed off hydraulically from the atmosphere by a sealing weld 8. The valve insert 1 also receives the valve body 4, which includes a valve seat 10 into which the tappet 2' plunges in sealing fashion in order to accomplish the sealing function of the magnet valve 30'. As also seen from FIG. 5, the tappet 2' is guided via a tappet guide 11, and the restoring spring 3 is guided via centering means 2.2' on the tappet 2' in the valve insert 1; in contrast to the conventional magnet valve 40 of FIG. 7, the restoring spring 3 is centered not only on just one end via a relatively short length of a spring guide 22 on the tappet 2, but instead is radially guided and stabilized by the centering means, embodied as a lengthened spring guide 2.2', over virtually the entire spring length, so that the other end of the restoring spring 3, which rests on the valve body 4, is also effectively centered and stabilized.

As can be seen from FIG. 6, the tappet 2' for the magnet valve 30' of the invention shown in FIG. 5 has a contact face 2.1; a lengthened spring guide 2.2', by which the restoring spring 3 slipped onto it is guided radially on the inside over a substantial portion of its length; a shortened tappet cone 2.3'; a shortened transition region 2.4'; and a tappet dome 2.5, which plunges in sealing fashion into the valve seat 10. In the exemplary embodiment shown, the centering means are embodied as a lengthened spring guide 2.2', which shortens the tappet cone 2.3' and the transition region 2.4' of the tappet 2', so that the tappet cone 2.3' is shifted in the direction of the tappet dome 2.5. Because of the lengthened spring guide 2.2', the restoring spring 3 is centered and radially guided from inside over the substantial portion of its length, so that a fluid flow in the magnet valve 30' is advantageously prevented from causing unwanted influence on the spring behavior. Thus the lengthened spring guide 2.2', analogous to the axial centering ribs 2.6, can for instance prevent lateral deflection of the restoring spring 3 and/or lifting of the restoring spring 3 from the valve body 4 and/or relative motions or vibration of the turns of the restoring spring 3.

The dimension of the lengthened spring guide 2.2' for the restoring spring 3 is adapted to the restoring spring 3 and to the other conditions of use. Thus the lengthened spring guide 2.2' is not extended as far as the tappet dome 2.5, so as not to adversely affect the flow behavior through the valve assembly.

The foregoing relates to preferred exemplary embodiments of the invention, it being understood that other variants and embodiments thereof are possible within the spirit and scope of the invention, the latter being defined by the appended claims.

We claim:

1. A magnet valve comprising a valve body, a valve insert including a tappet guide, a tappet having a contact face, a spring guide adjacent the contact face and a dome, the tappet being guided movably in the tappet guide of the valve insert, a spiral restoring spring engaging the contact face and bracing the tappet on the valve body, one end of the restoring spring being guided radially from inside the spring by the spring guide, and centering means on the tappet centering and guiding the restoring spring from inside over a major portion of the length of the restoring spring, wherein the tappet comprises a tappet cone portion and transition region beyond the spring guide, and wherein the centering means are embodied as at least two axially extending centering ribs, originating at the spring guide of the tappet, the centering ribs lengthening the circumference of the spring guide beyond the tappet cone to inside the transition region of the tappet.

2. The magnet valve as defined by claim 1, wherein the dimensions of the at least two axial centering ribs are adapted in the radial direction to the inside diameter of the restoring spring.

3. The magnet valve as defined by claim 2, wherein the at least two axially extending centering ribs come to an end virtually perpendicularly on one end, which is oriented toward a tappet dome.

4. The magnet valve as defined by claim 3, wherein the virtually perpendicular ends of the at least two axially extending centering ribs are embodied in rounded form, and wherein a radius of the rounded portion is dependent on properties of the restoring spring.

5. The magnet valve as defined by claim 4, wherein the tappet includes four axially extending centering ribs, which preferably have an average spacing of 90° from one another.

6. The magnet valve as defined by claim 3, wherein the tappet includes four axially extending centering ribs, which preferably have an average spacing of 90° from one another.

7. The magnet valve as defined by claim 2, wherein the at least two axially extending centering ribs come to an end on one end shallowly at a predeterminable angle, which end is oriented toward the tappet dome.

8. The magnet valve as defined by claim 7, wherein the ends, coming to an end shallowly at a predeterminable angle, of the at least two axially extending centering ribs have a rounded transition, the radius of the rounded transition being dependent on properties of the restoring spring.

9. The magnet valve as defined by claim 2, wherein the tappet includes four axially extending centering ribs, which preferably have an average spacing of 90° from one another.

10. The magnet valve as defined by claim 1, wherein the at least two axially extending centering ribs come to an end virtually perpendicularly on one end, which is oriented toward a tappet dome.

11. The magnet valve as defined by claim 10, wherein the virtually perpendicular ends of the at least two axially extending centering ribs are embodied in rounded form, and wherein a radius of the rounded portion is dependent on properties of the restoring spring.

12. The magnet valve as defined by claim 11, wherein the tappet includes four axially extending centering ribs, which preferably have an average spacing of 90° from one another.

13. The magnet valve as defined by claim 10, wherein the tappet includes four axially extending centering ribs, which preferably have an average spacing of 90° from one another.

14. The magnet valve as defined by claim 1, wherein the at least two axially extending centering ribs come to an end on one end shallowly at a predeterminable angle, which end is oriented toward the tappet dome.

15. The magnet valve as defined by claim 14, wherein the ends, coming to an end shallowly at a predeterminable angle, of the at least two axially extending centering ribs have a rounded transition, the radius of the rounded transition being dependent on properties of the restoring spring.

16. The magnet valve as defined by claim 15, wherein the tappet includes four axially extending centering ribs, which preferably have an average spacing of 90° from one another.

17. The magnet valve as defined by claim 14, wherein the tappet includes four axially extending centering ribs, which preferably have an average spacing of 90° from one another.

18. The magnet valve as defined by claim 1, wherein the tappet includes four axially extending centering ribs, which preferably have an average spacing of 90° from one another.

19. A magnet valve comprising a valve body, a valve insert including a tappet guide, a tappet having a contact face, a spring guide adjacent the contact face and a dome, the tappet being guided movably in the tappet guide of the valve insert, a spiral restoring spring engaging the contact face and bracing the tappet on the valve body, one end of the restoring spring being guided radially from inside the spring by the spring guide, and centering means on the tappet centering and guiding the restoring spring from inside over a major portion of the length of the restoring spring, wherein the centering means are embodied as a lengthened spring guide and a shortened tappet cone and transition region of the tappet, wherein the tappet cone is shifted in the direction of a tappet dome, and wherein the restoring spring is centered and radially guided from inside over the major portion of its length by the lengthened spring guide.

* * * * *